Patented Apr. 21, 1953

2,635,979

UNITED STATES PATENT OFFICE 2,635,979

POLYCYCLIC INSECT TOXICANTS

Rex E. Lidov, Denver, Colo., assignor, by mesne assignments, to Shell Development Company, Emeryville, Calif., a corporation of Delaware No Drawing. Application December 31, 1947, Serial No. 795,140

11 Claims. (Cl. 167—30)

This invention relates to new compositions of matter possessing unexpectedly high toxicity to insect life.

More specifically, this invention relates to a group of polycyclic halogenated hydrocarbons and polycyclic halogenated hydrocarbon derivatives which show not only unexpectedly high insecticidal activity but, in addition, a surprisingly high order of stability to reagents which normally readily degrade the previously known organic halogenated insect toxicants, and to methods of producing such compositions.

One object of this invention is to produce organic materials possessing a high order of insecticidal activity.

Another object of this invention is to produce highly stable insecticidally active materials.

Another object of this invention is to produce stable, insecticidally active organic compounds simply and economically.

A further object of this invention is the production of a group of stable, insecticidally active organic compounds with varying periods of residual insecticidal activity.

Other objects, features, capabilities and advantages are comprehended by the invention, as will later appear and as are inherently possessed thereby.

In recent years a number of halogonated hydrocarbons or simple hydrocarbon derivatives have been discovered which possess, to a high degree, the property of toxicity to various forms of insect life. These materials, while toxic to a greater or lesser extent to mammalian life are yet so much more toxic to insects that under normal conditions of use mammalian toxicity can usually be disregarded. None-the-less, because of the toxicity of these compounds to warm blooded animals, their use, in cases where it would otherwise be desirable, is necessarily restricted and their utility consequently decreased.

Moreover, all of these materials contain halogen atoms which, in the presence of alkalinity, are labile. The loss of halogen under these circumstances, whether by substitution reactions or by dehydrohalogenation leaves the altered organic molecule with its insecticidal activity either markedly decreased or altogether destroyed.

The coincidence of highly labile halogen, mammalian toxicity and insecticidal activity has been so marked that many able investigators in the field have suspected that a causal relationship must exist between the ease of halogen removal and physiological properties of the molecule, and many attempts to develop quantitative correlations between these properties have been made. In addition, a number of theories have been advanced in an attempt to justify the establishment of such a causal relationship.

The ease with which halogen is lost, with the concomitant loss of insecticidal activity, from these compounds has, of course, restricted their use in situations in which, were they more stable, they could advantageously be employed. This unfortunate instability has also increased the difficulties of formulating them for practical field use and of storing them.

Quite unexpectedly, therefore, I have now made the surprising and novel discovery that a group of new halogenated compounds can be prepared which, while possessing a very high order of insecticidal activity, have much lower mammalian toxicity than the previously known halogenated insect toxicants and have their halogen atoms so firmly bound as to make them stable under conditions of alkalinity which cause the older halogenated insecticidal materials to lose halogen and, simultaneously, to lose activity.

These new compounds of my invention are characterized by the following structural formula:

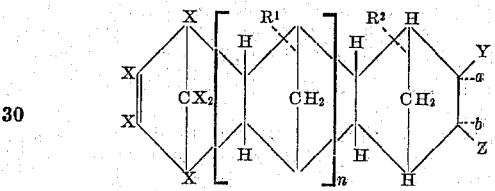

in which X represents a halogen atom and $n$ has an integral value from 0 to 3, both inclusive. Y and Z are selected from the group of monovalent atoms and radicals consisting of H, R, Cl, Br, I, OH, OR, SH, SR, $NH_2$, NHR, $NR_2$, $(NR_3)^+$,

—COOH, or —C≡N and $a$ and $b$ are representative of bonds attached to monovalent atoms and radicals selected from the above defined group or to each other. When $a$ and $b$ are attached to each other there will, of course, be introduced a second double bond into the polycyclic ring structure shown. In the group of atoms and radicals set forth above R represents a saturated or unsaturated alkyl, cycloalkyl or aryl radical or a substituted derivative thereof. $R^1$ and $R^2$ in the structural formula shown represent one or more halogen atoms or one or more substituting radicals as defined above for R which may be attached to carbon atoms forming the indicated rings of the structure shown.

Those skilled in the art will at once recognize that a selection of the monovalent atoms and radicals in the defined group for attachment to the bonds a and b and in place of Y and Z might so be made as to lead to compounds which are unstable. Such a situation would exist, for example, if the symbol Y is taken to represent a hydroxyl radical and the bond a is simultaneously attached to a hydroxyl radical. In such a case the compound represented would, in fact, be nonexistent since the configuration shown would lose the elements of water to form a ketone. It is my explicit intention that all of the stable compounds which are obtained as a result of the stabilization of the numerous compounds which can be represented by the above shown general structural formula through the loss of $H_2O$, HOR, $H_2S$, SHR, $NH_3$, $NH_2R$, $NHR_2$ or hydrogen halide are to be included within the scope of my invention.

Similarly, it is recognized that such selection of the monovalent atoms and groups will in some cases lead to representations of compounds which will, in general, be more stable, and hence will exist, in tautomeric modifications of the structures thus represented. This would be the case if, for example, Y is taken to represent a hydroxyl radical and the bonds a and b are joined to each other to form a new double bond. In this case the compound represented by the indicated structure will be a ketone. The stable compounds which result from all such tautomeric shifts are also explicitly intended as within the scope of my invention.

For the sake of simplicity only one $R^1$ and one $R^2$ representing halogen atoms and one or more R groups as previously defined are shown attached to the carbon atoms of the respective rings in which they appear. It is to be understood that they are to represent, either one such group or a multiplicity of such groups which may include both of the species indicated. Such halogen atoms can readily be introduced by direct halogenation of the parent compounds involved. The alkyl type groups may arise through the use of substituted cyclopentadienes in the preparation of the polycyclic dienophiles and similarly through the use of fulvenes in the preparation of these dienophiles.

These new and remarkable compounds which I have discovered are readily and easily prepared. In general they can most readily be made by means of the Diels-Alder diene synthesis using a hexahalocyclopentadiene and a suitable polycyclic dienophile such as a bicycloheptene or a tetracyclododecene as the generators.

The syntheses can be accomplished most simply by sealing the generators into a suitable reaction vessel capable of withstanding pressures up to 125-150 pounds per square inch and heating the vessel and its contents to a temperature not exceeding 225° C. for a period of one to twenty hours.

The statement of reaction conditions hereinabove given is actually a recital of the most vigorous conditions which need be employed for the synthesis of the new compositions of matter which we have discovered. In the majority of cases, the reactions proceed rapidly and well at temperatures between 110-150° C. and at pressures which are only slightly above atmospheric pressure. Actually, it is the vapor-pressure of the lowest boiling generator which determines the operating pressure, and when the boiling point of this generator lies above 125° C. the synthesis can usually be carried out at atmospheric pressure. Of course, if the polycyclic reactant boils in the temperature range in which the reaction is being conducted provision must be made for its reflux.

These novel chlorinated hydrocarbons and hydrocarbon derivatives of my invention can also be prepared in the presence of suitable solvents. In general, reactions in solution require a longer period of time than reactions carried out in the absence of solvent. There is some advantage, however, which results from the fact that the reaction and the reaction temperature can be somewhat more easily controlled when a solvent is used.

A wide variety of solvents can be employed in carrying out these preparations. The rate of reaction will be highest if the solvent chosen has a boiling point within the range of between 125-150° C. For this purpose, chlorobenzene, xylene, dibutyl ether, etc. can advantageously be chosen. If desired, however, materials such as benzene, toluene, butyl alcohol, dioxane, etc. can also be used, at the expense, of course, of reaction time.

The general desirability of a reaction temperature of 110° C., or higher, results from the fact that, in all but a few exceptional cases, the hexahalocyclopentadienes act as dienes in the Diels-Alder synthesis at an appreciably rapid rate only at or above this temperature.

Example I illustrates the extreme ease with which one of the insecticidal compositions of our invention can be prepared in the absence of solvent. In this case the desired reaction product is hexachlorotetracyclododecene. The dienophilic generator is bicyclo-(2,2,1)-2-heptene first prepared by Joshel and Butz (J. Am. Chem. Soc., 63, 3350 (1941)).

EXAMPLE I

Equimolar quantities of bicyclo-(2,2,1)-2-heptene and hexachlorocyclopentadiene are heated together for five hours at 115° C. and then left to stand for approximately 16 hours. The viscous liquid which is thus obtained is chilled to induce crystallization and the solid is separated from the slushy mass, which results from this treatment, by filtration. Recrystallization from hot methanol of the oily solid thus separated produces white crystals of hexachlorotetracyclododecene which melts at 77-78° C. This compound has the folowing probable structural formula:

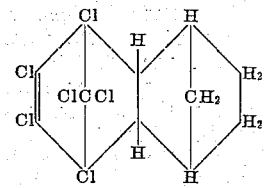

Calculated for the product of Example I:
$C_{12}H_{10}Cl_6$ chlorine (theoretical), 57.98%
Found: chlorine, 58.14%, 58.21%.

Hexachlorotetracyclododecene can also be prepared by the methods of Example II which illustrates the synthesis in the presence of a solvent.

EXAMPLE II

Equimolar amounts of bicyclo-(2,2,1)-2-heptene are dissolved in approximately three times their combined weight of xylene and the resulting solution is gently refluxed for fourteen hours. The solvent is then removed by distillation at 10-

20 mm. mercury pressure and the resulting oily viscous residue is dissolved in boiling ethanol and left to cool slowly. After 16 hours a white crystalline solid can be collected which, recrystallized from methanol yields a pure material melting at 77–78° C. which is identical with the product of Example I.

In very similar fashion a hexahalohexacycloheptadecene can be produced. In this case the dienophilic generator is tetracyclododecene or 1,4,5,8-dimethanooctahydronaphthalene, a hydrocarbon which has not been previously reported. This hydrocarbon results from the addition of one mole of cyclopentadiene to one mole of bicyclo-(2,2,1)-2-heptene in a Diels-Alder type reaction and can be readily recovered from the higher boiling fractions of the material prepared when the procedure of Joshel and Butz (loc. cit.) is followed. The tetracyclododecene employed in the reaction illustrated in Example III was obtained in this fashion and was separated by fractionation of the crude bicycloheptene reaction mixture. The material used boiled at 102° C. at 15 mm. mercury pressure.

EXAMPLE III

A mixture of tetracyclododecene and hexachlorocyclopentadiene containing a 10% molar excess of the former is heated at 160° C. for two and one-half hours. On cooling, the crude product becomes solid. This solid, twice recrystallized from hot hexane, yields white crystals melting between 173–175° C.

This compound has the following probable structural formula:

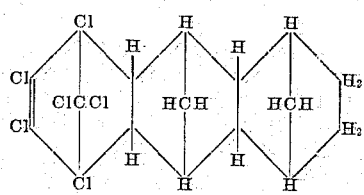

Calculated for hexachlorohexacycloheptadecene $C_{17}H_{16}Cl_6$: chlorine 49.13%
Found: chlorine 49.98%, 49.90%.

While pure compounds can be prepared following the procedures illustrated in Examples I, II and III, it is actually not necessary to do so in order to produce a superior insecticidal material. I have found that the composition obtained by reacting a hexahalocyclopentadiene with the crude material which is derived by treating ethylene with cyclopentadiene, with dicyclopentadiene or with a mixture of the two according to the method of Joshel and Butz (loc. cit.) or of Thomas (Ind. and Eng. Chem. 36, 310–11 (1944)). The composition thus produced possesses all of the desirable properties previously enumerated and is essentially equivalent in insecticidal potency to the material of Example I.

EXAMPLE IV

Fifty-five grams of hexachlorocyclopentadiene and twenty-seven and one-half grams of a crude bicycloheptene reaction mixture (from the Diels-Alder reaction of cyclopentadiene-dicyclopentadiene with ethylene) are placed in a stainless steel pressure vessel and heated at 145° C. for three hours. The crude dark brown viscous oil thus obtained is a highly potent insecticidal material possessing 92% of the toxicity of the product of Example I.

The fraction boiling at 159–164° C. at approximately 3 mm. mercury pressure on distillation of the crude reaction product is collected as a waxy solid; recrystallization of this solid from hot methanol produces white crystals which melt at 77–78° C. This crystalline product is identical with that of Example I.

Other compounds of the same general type falling within the general field of our invention can be prepared in much the same fashion. Example V illustrates the preparation of the acetoxy analogue of hexachlorotetracyclododecene. In this case the dienophilic generator is 5-acetoxybicyclo-(2,2,1)-2-heptene. This bicyclic compound was first reported by Alder and Rickert (Ann., 543, 1–27 (1939)).

EXAMPLE V

Hexachlorocyclopentadiene (80 gms., 10% excess) and 5-acetoxybicyclo-(2,2,1)-2-heptene (40 gms.) are mixed and the mixture is heated, with occasional stirring at 150° C. for a period of two and one-half hours. On cooling the mixture solidifies. This solid is dissolved in boiling hexane (ca. 400 ml.); the resulting solution is treated with a decolorizing charcoal and cooled. White crystals are thus obtained which, when separated on a filter and dried, melt at 170–172° C.

This compound has the following probable structural formula:

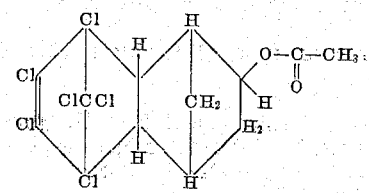

Calculated for acetoxyhexachlorotetracyclododecene $C_{14}H_{12}Cl_6O_2$: Chlorine (theoretical) 50.2%.
Found: Chlorine 51.6%.

Examples VI and VII illustrate the conversion of the acetoxy hexachlorotetracyclododecene to the corresponding hydroxy and chloro derivatives.

EXAMPLE VI

Acetoxyhexachlorotetracyclododecene (Example V) (27.0 gms.) is suspended in a solution made up of 100 ml. of a 5% aqueous solution of sodium hydroxide and 110 ml. of 95% ethanol and the suspension thus obtained is refluxed for thirty minutes. At the end of this time the resulting solution is poured into 300 ml. of water and the diluted solution is extracted with ether. The ether extract is washed with water, dried over anhydrous sodium sulfate and the ether is removed by evaporation to leave a solid residue. This residue, once recrystallized from boiling heptane, yields white crystals of hydroxyhexachlorotetracyclododecene melting between 132–134° C.

This compound has the following probable structural formula:

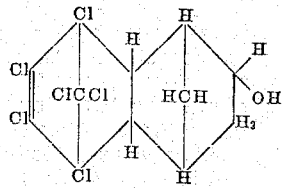

Calculated for $C_{12}H_{10}OCl_6$: Chlorine (theoretical) 55.6%
Found: Chlorine 54.1%

EXAMPLE VII

Five grams of hydroxyhexachlorotetracyclododecene and five grams of phosphorus pentachloride are added to 110 ml. of hexane and the mixture is refluxed for thirty minutes, by which time the suspension becomes almost clear. At the end of the refluxing period the mixture is cooled and poured onto 200 gms. of ice. The mixture is then set aside until all of the ice is melted and the hexane layer is then separated. The aqueous layer is once extracted with fresh, hot hexane, the hexane extracts are combined, cooled, dried and evaporated to a 20 ml. volume whereupon crystalline heptachlorotetracyclododecene is obtained which, on separation and drying, melts between 152–153° C.

This compound has the following probable structural formula:

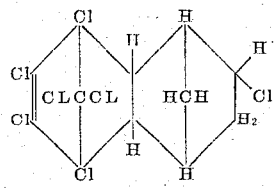

Calculated for $C_{12}H_9Cl_7$ Chlorine (theoretical) 61.9%

Found for product of Example VII: Chlorine 61.0%

Chloro derivatives related to the parent material hexachlorotetracyclododecene can also be prepared directly. This is illustrated in Examples VIII and IX.

Example VIII illustrates the synthesis of 5,5-dichlorobicyclo-(2,2,1)-2-heptene. Example IX shows the preparation of octachlorotetracyclododecene obtained by means of a Diels-Alder synthesis using hexachlorocyclopentadiene and the dichlorobicycloheptene of Example VIII as the generators.

EXAMPLE VIII

*Preparation of 5,5-dichlorobicyclo-(2,2,1)-2-heptene*

A mixture of one mole of cyclopentadiene and 1.1 moles of 1,1-dichloroethylene is placed into a stainless steel pressure vessel, preferably in the presence of a polymerization inhibitor such, for example, as ditertiary butyl hydroquinone, and heated for a period of three hours at 190° C. The desired 5,5-dichlorobicycloheptene boils at 61–64° C. at 12 mm. mercury pressure and is recovered from the crude reaction mixture by fractional distillation.

EXAMPLE IX

An equimolar mixture of hexachlorocyclopentadiene and the 5,5-dichlorobicycloheptene of Example VIII is heated, at atmospheric pressure, for a four hour period at 200° C. At the end of this period the mixture is cooled and distilled in vacuo. After removal of unreacted starting materials the desired octachlorotetracyclododecene is obtained in the fraction boiling between 153–155° C. at 0.07 mm. mercury pressure. This distillate fraction is recrystallized from acetone and the desired product is obtained as white crystals melting between 119–121° C.

This compound has the following probable structural formula:

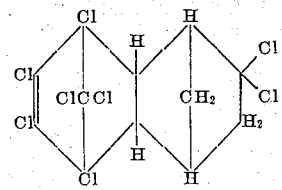

Calculated for $C_{12}H_8Cl_8$: chlorine (theoretical), 65.08%

Found for product of Example IX: chlorine, 65.02%

Example X illustrates the preparation of an alkyl type derivative of hexachlorotetracyclododecene. In this case the substituting group is a phenyl radical and the desired compound is obtained by causing 5-phenylbicyclo-(2,2,1)-2-heptene to react with hexachlorocyclopentadiene. Obviously, similar derivatives, such for example as dimethyl hexachlorotetracyclododecene, trimethylhexachlorotetracyclododecene, ethylmethylhexachlorotetracyclododecene, etc., can be prepared by starting with 5,6 dimethyl bicyclo-(2,2,1)-2-heptene, 5,5,6 trimethylbicyclo-(2,2,1)-2-heptene, 5-ethyl-6-methylbicyclo-(2,2,1)-2-heptene, etc. as the dienophilic generator.

EXAMPLE X

Hexachlorocyclopentadiene (42.0 gms.) and 5-phenylbicyclo-(2,2,1)-2-heptene (25.0 gms.) are mixed and heated in an oil bath at 135–140° C. for a five hour period. The crude reaction is cooled and fractionated in vacuo. The desired phenylhexachlorotetracyclododecene is obtained in the fraction boiling between 190–210° C. at 0.5 mm. mercury pressure. This crude product is redistilled and the material boiling between 190–197° C. at 0.5 mm. is collected. Recrystallized from pentane the phenylhexachlorotetracyclododecene is obtained as a white crystalline solid melting between 91–92.5° C.

This compound has the following probable structural formula:

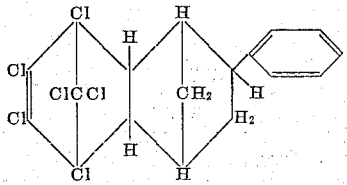

Calculated for $C_{18}H_{14}Cl_6$: chlorine (theoretical), 48.1%

Found for product of Example X: chlorine, 50.1%

It is obvious that one skilled in the art will immediately see how other compounds similar in character to those here specifically described can readily be prepared. The hydroxy derivatives described in Example VI can readily be oxidized to the corresponding keto derivatives. Again, many halogenated derivatives similar to those formulated in accordance with the teachings of Examples VII and IX can be prepared by direct halogenation of the compounds already discussed and by direct halogenation of other new compounds which will be apparent as a result of the present disclosure to those skilled in the art.

The examples here given are, therefore, presented simply to illustrate the methods which may be used in preparing the new compounds which I have discovered. They are cited for illustrative purposes only and are not to be taken as limiting the scope or character of my invention.

As is to be expected the alkaline stability of these new compositions and their mammalian toxicity will be dependent to some extent on the number and character of the substituents which are attached to the basic halogenated hydrocarbon structures. For the present purpose the basic hydrocarbon structures are taken to be those represented by the structural formula:

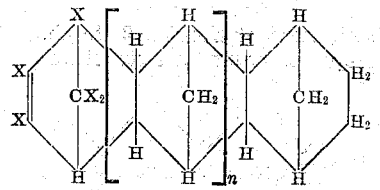

wherein $n$ assumes an integral value from 0 to 3. both inclusive, and X represents a halogen atom.

In this connection it should be pointed out that a compound such, for example, as an acetoxy derivative cannot be expected to exhibit stability toward alkali since it contains a hydrolyzable ester grouping. It is interesting to note, however, that the compound which is obtained as a result of the ester hydrolysis, the corresponding hydroxy derivative, is even more insecticidally active than is the starting material. This will be shown in the data which follow.

These new compositions of matter which I have discovered are all highly toxic to insect life. This property, in view of its relatively high alkaline stability and low mammalian toxicity, is a phenomenon, as has already been indicated, both completely unexpected and of enormous economic significance. All of the compounds listed below show insect toxicity equal to or greater than that of DDT. These facts are illustrated in Table I.

Table I lists a number of the new compositions of my invention and shows their toxicity to the common house fly (Musca domestica) in terms of the new halogenated insecticide Chlordane which for this purpose is rated at 100%. The figures which are shown were obtained using the Kearns modified small chamber method of test (Soap and Sanitary Chemicals, May, 1948, page 133) and the figures in the table represent the relationship between the weight of Chlordane required to produce an LD₅₀ and the weight of compound required to produce this same mortality.

TABLE I

| Compound of: | Percent |
|---|---|
| Example I | 100 |
| Example III | 60 |
| Example IV | 92 |
| Example V | 22 |
| Example VI | 69 |
| Example VII | 54 |
| p,p'-DDT | 33 |
| Chlordane | 100 |

Tests of the insecticidal potency of my new compounds using insects other than flies attest the generality of their high insect toxicity.

Thus, when the compound of Example I, hexachlorotetracyclododecene, is compared with Chlordane as a toxicant for the milkweed bug the two compounds are shown to have equal activities.

Similarly, comparative tests utilizing the German roach as the test insect fail to indicate significant differences between the dosages of the two required to produce equal mortalities.

These new compounds also show significant residual toxicity. In this respect they lie between Chlordane and DDT. This fact, coupled with the fact of their very low mammalian toxicity indicates for them an immense field of usefulness as agricultural insecticidal materials.

The greatly reduced mammalian toxicity of our new compounds is made evident by a recitation of the results obtained in comparing the toxicity of the hexachlorotetracyclododecene with that of the highly publicized insecticide 1,1-di-(p-chlorophenyl)-2,2,2-trichloroethane (p,p'-DDT).

In feeding tests, using white rats as the test animals, my new compound, hexachlorotetracyclododecene, failed to produce any mortality when administered to the rats in a dosage equal to 160% of that at which p,p'-DDT causes a 50% mortality rate.

The remarkably high alkaline stability of my new compositions is demonstrated by the data of Table II. Table II shows the number of chlorine atoms which are lost per mole of compound tested under the conditions of a test based on the procedure of Gunther (F. A. Gunther, Ind. & Eng. Chem., Analytical Ed. 17,149-50 (1945)).

TABLE II

| Compound | Gram atoms of chlorine lost per mole of compound |
|---|---|
| hexachlorotetracyclododecene (Example I) | 0 |
| heptachlorotetracyclododecene (Example VII) | 0.17 |
| octachlorotetracyclododecene (Example IX) | 0.23 |
| Chlordane | 2.1 |
| p,p'-DDT | 1.0 |

My new compositions of matter can be utilized as insect toxicants in all of the ways customary in the art. Thus they can be dissolved in the insecticide base oils normally employed (as was done to obtain the data of Table I) and the resulting solutions sprayed and otherwise employed in the usual fashions. They can also be combined with finely divided carriers to produce both wettable and non-wettable insecticidal dusts; they can be used in the presence of emulsifying agents, with water and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

It will be apparent to those skilled in the art that these new compositions of matter which I have invented will have many uses other than those already enumerated. Thus, some of these materials will have value as plasticizers and as tackifiers in many types of resinous and polymer compositions. These compositions are also valuable as starting compounds and intermediates for perfumes, medicinals, fungicides and other organic compounds useful in the arts and sciences.

Moreover, many modifications of the basic concept of my invention here presented will be evident to those skilled in the art. Thus, in place of a hexahalocyclopentadiene, as the diene, compounds such as 1,1-dialkoxy-2,3,4,5-tetrahalocyclopentadiene or the corresponding 1,1-dialkylmercapto-2,3,4,5-tetrahalocyclopentadiene might be employed. In like fashion in place of the bicycloheptene derivatives here discussed 1,4-oxy compounds obtained by the reaction of furan as a diene with suitable dienophiles might be employed as the dienophilic generator to be used with a hexahalocyclopentadiene, as the diene, in the Diels-Alder reaction to produce new compounds of the type we here disclose. Such modifications are properly to be included within the scope of my basic discovery.

It is claimed:

1. A compound selected from the group consisting of (1) 1,4,5,8,9,10-trimethano-1,2,3,4,13,13-hexachloro - 1,4,4a,5,6,7,8a,9,9a,10,10a - dodecahydroanthracene melting at from about 173 to about 175° C., (2) 1,2,3,4,10,10-hexachloro-1,4,4a,5,6,7,8,8a - octahydro - 1,4,5,8 - dimethanonaphthalene melting at from about 77 to about 78° C., (3) 6-chloro, (4) 6,6-dichloro, (5)-6-acetoxy, (6) 6-hydroxy, (7) 6-phenyl, (8) 6-keto, (9) 6,7 dimethyl, (10) 6,6,7-trimethyl, and (11) 6-ethyl-7-methyl derivatives of said dimethanonaphthalene.

2. A compound having the structure:

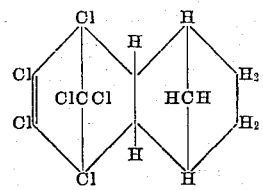

and melting point of about 77° to about 78° C.

3. A compound having the structure:

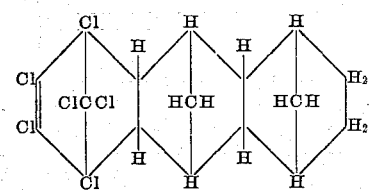

and melting point of about 173° to about 175° C.

4. A compound having the structure:

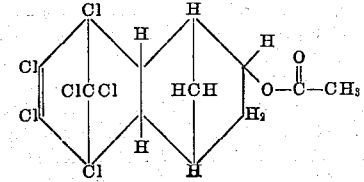

and melting point of about 170° to about 172° C.

5. A compound having the structure:

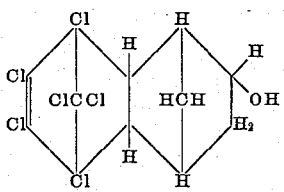

and melting point of about 132° to about 134° C.

6. A compound having the structure:

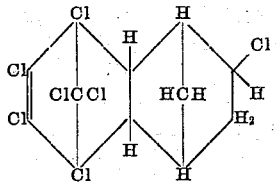

and melting point of about 152° to about 153° C.

7. The method of forming a new composition of matter which comprises reacting hexachlorocyclopentadiene with bicyclo-(2.2.1)-2-heptene at a temperature between about 110 to about 225° C.

8. As an insecticidal composition of matter a compound of claim 1 disseminated in an insecticidal adjuvant as a carrier therefor.

9. The method which comprises applying to insects and their habitats a compound of claim 1.

10. The method which comprises applying to insects the compound 1,2,3,4,10,10-hexachloro-1,4,4a,5,6,7,8,8a - octahydro - 1,4,5,8 - dimethanonaphthalene having a melting point of about 77° to about 78° C.

11. The method which comprises applying to insect habitats the compound 1,2,3,4,10,10-hexachloro - 1,4,4a,5,6,7,8,8a - octahydro - 1,4,5,8 - dimethanonaphthalene having a melting point of about 77° to about 78° C.

REX E. LIDOV.

References Cited in the file of this patent

UNITED STATES PATENTS

| Number | Name | Date |
|---|---|---|
| 2,340,908 | Thomas | Feb. 8, 1944 |
| 2,349,232 | Joshel | May 16, 1944 |
| 2,382,038 | Bruson | Aug. 14, 1945 |
| 2,519,190 | Hyman | Aug. 15, 1950 |

OTHER REFERENCES

Bruson et al., Jour. Am. Chem. Soc., volume 67, 723-8 (1945).

Prill, Jour. Am. Chem. Soc., volume 69, 62-63 (1947).